United States Patent [19]

Vogt

[11] Patent Number: 4,916,906

[45] Date of Patent: Apr. 17, 1990

[54] BREACH-COOLED STRUCTURE

[75] Inventor: Robert L. Vogt, Marblehead, Mass.

[73] Assignee: General Electric Company, Lynn, Mass.

[21] Appl. No.: 176,482

[22] Filed: Mar. 25, 1988

[51] Int. Cl.$^4$ .............................................. F23R 3/04
[52] U.S. Cl. ......................................... 60/757; 60/752
[58] Field of Search ................. 60/754, 755, 757, 759, 60/752; 110/180, 336; 165/154, 903

[56] References Cited

U.S. PATENT DOCUMENTS

| 3,643,430 | 2/1972 | Emory, Jr. et al. | 60/39.65 |
|---|---|---|---|
| 3,978,662 | 9/1976 | DuBell et al. | 60/39.65 |
| 4,109,459 | 8/1978 | Ekstedt et al. | 60/757 |
| 4,253,301 | 3/1981 | Vogt | 60/39.46 |
| 4,422,300 | 12/1983 | Dierberger | 60/757 |
| 4,446,693 | 5/1984 | Pidcock et al. | 60/39.32 |
| 4,480,436 | 11/1984 | Maclin | 60/757 |
| 4,485,630 | 12/1984 | Kenworthy | 60/757 |
| 4,529,358 | 7/1985 | Papell | 416/97 A |
| 4,555,901 | 12/1985 | Wakeman et al. | 60/39.32 |
| 4,567,730 | 2/1986 | Scott | 60/755 |
| 4,573,865 | 3/1986 | Hsia et al. | 415/115 |
| 4,695,247 | 9/1987 | Enzaki et al. | 60/755 |
| 4,787,209 | 11/1988 | Taylor et al. | 60/757 |
| 4,800,718 | 1/1989 | Zimmerman | 60/757 |

FOREIGN PATENT DOCUMENTS 182034 10/1983 Japan ................................. 60/757

OTHER PUBLICATIONS

Dr. G. J. Sturgess, NASA-CR-159656, "Advanced Low-Emissions Catalytic Combustor Program, Phase I Final Report", Jun. 1981, pp. i–iv, 1, 15–17, 20, 31, 41, 48, 57, 71, 74–76, 78, 80, 83, 84, 88, 89, 92, 93, 103, 104, 122–128, 141 and 142.
Northern Research and Engineering Corporation (NREC), "The Design and Development of Gas Turbine Combustors", vol. II, 1980, Cover page and pp. iii, 4.8, 4.9, and 4.31.
Andrews, G. E., et al.; ASME Paper 87-67-93, "Full Coverage Impingement Heat Transfer: The Influence of the Number of Holes"; 5/31/87–6/4/87.
Perry, K. P.; "Heat Transfer by Convection from a Hot Gas Jet to a Plane Surface"; Proceedings of the Institution of Mechanical Engineers, 1954; vol. 168, No. 30, pp. 775–780.
Hilgeroth, Ing. E.; "Heat Transfer for Jet Flow Perpendicular to the Exchange Surface"; Chemie–Ing. Techn. 37 Jahrg. 165/Nr. 12, nine pages beginning with p. 1264.

Primary Examiner—Louis J. Casaregola
Assistant Examiner—Timothy S. Thorpe
Attorney, Agent, or Firm—Francis L. Conte; Jerome C. Squillaro

[57] ABSTRACT

The present invention comprises a method and apparatus for improving cooling of a wall in a gas turbine engine. The method and apparatus provide breach cooling of an imperforate wall, such as a combustor liner, for improving the cooling thereof. The breach cooling includes structure for channeling a cooling fluid as a jet toward an outer surface of the imperforate wall, with the jet having sufficient memontum to breach a boundary layer of the cooling fluid which forms over the wall outer surface to allow the jet to contact the wall outer surface for more effective cooling thereof. In an exemplary embodiment of the invention, the breach-cooled wall is an upstream portion of the gas turbine engine combustor, and the inner surface of the combustor liner facing the combustion gases is characterized by not having a film-cooling boundary layer of air to reduce quenching of the combustion gases for reducing exhaust emissions.

27 Claims, 2 Drawing Sheets

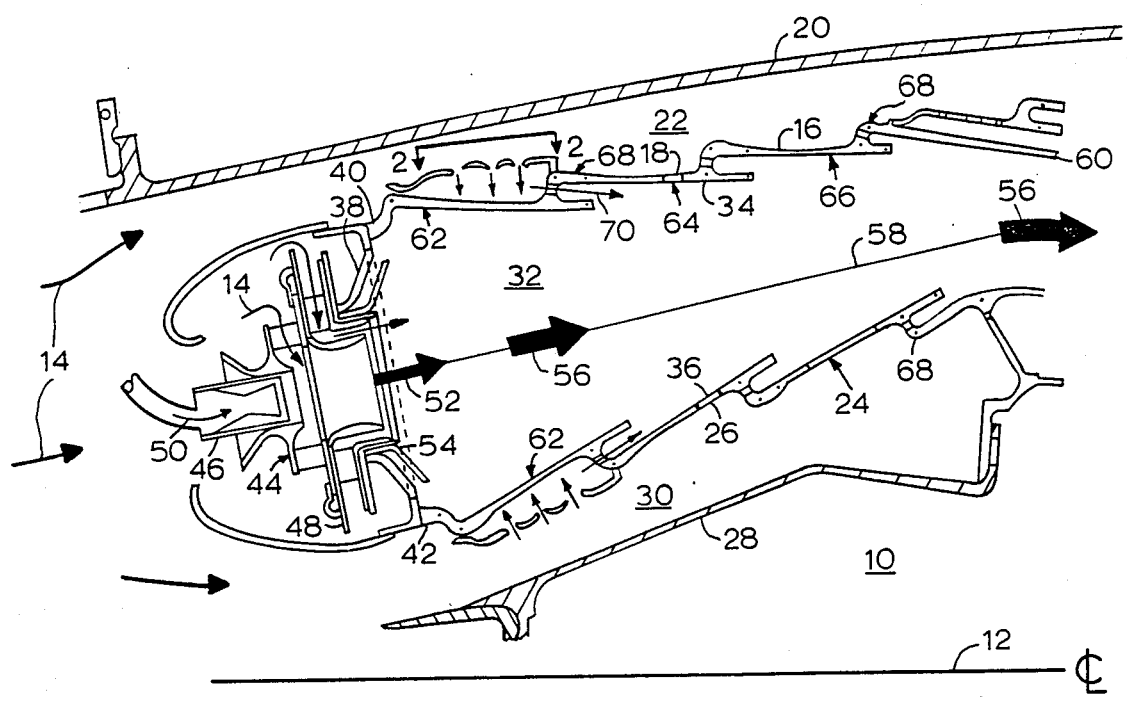

BREACH-COOLED STRUCTURE

BACKGROUND OF THE INVENTION

The present invention relates generally to means and methods for cooling structures in a gas turbine engine, and, more specifically, to an improved cooling method and means usable in a gas turbine engine combustor for reducing exhaust emissions thereof.

Commercial aircraft gas turbine engines must meet certain federally-mandated smoke and emissions requirements. For example, the Federal Aviation Administration (FAA) has a regulation which limits the amount of unburned hydrocarbon emissions including smoke and vapor forms thereof. Furthermore, the International Civil Aeronautics Organization (ICAO) also places limits on emissions including unburned hydrocarbons, oxides of nitrogen and carbon monoxide.

The prior art includes various means for reducing gas turbine engine exhaust emissions including improved carburetors to more fully mix and atomize fuel and air for obtaining more complete combustion. It is known that unburned hydrocarbons will result where the combustion, or reaction, process occurs at less than about 1500° F., whereas complete burning of hydrocarbons will occur at reaction temperatures greater than about 2000° F., with reaction temperatures therebetween resulting in varying amounts of unburned hydrocarbons.

However, the combustion process generates such high temperatures in a gas turbine engine combustor that unless the combustor itself is adequately cooled, conventional metallic alloys used in fabricating the combustor will suffer severe thermal distress. Accordingly, conventional gas turbine engines employ means for film cooling the combustor liner to protect the liner from high temperature combustion gases. U.S. Pat. No. 3,978,662 - DuBell et al, assigned to the present assignee, discloses several means for providing effective film cooling of a combustor liner. The cooling fluid used for film cooling in a gas turbine engine is compressor discharge air which has a typical temperature of about 1000° F.

The use of a low temperature boundary layer, or film, of cooling air along the entire inner surface of a combustor liner provides for effective cooling of the liner from the hot combustion gases. However, since the temperature of that boundary layer is about the temperature of the cooling air, which is substantially less than about 1500° F., quenching, or cooling, of the fuel/air mixture against that boundary layer will occur during operation. Since combustion of the quenched fuel/air mixture along the cooling air boundary layer will therefore occur at temperatures less than about 1500° F., unburned hydrocarbons and carbon monoxide will be generated.

Depending upon the particular gas turbine engine model, these unburned hydrocarbons, as well as carbon monoxide, may meet the required exhaust emissions requirements. However, in a particular model of a gas turbine engine presently manufactured by the present assignee, more restrictive FAA and ICAO emissions requirements were enacted, thus requiring a change in design to reduce unburned hydrocarbon and carbon monoxide emissions to comply therewith. Inasmuch as the engine is a current production engine, it was desirable that changes be kept to a minimum within the restrictions imposed by a preexisting gas turbine engine design.

Accordingly, it is an object of the present invention to provide a new and improved combustor for a gas turbine engine.

Another object of the present invention is to provide a new and improved combustor effective for reducing exhaust emissions.

Another object of the present invention is to provide a new and improved combustor which reduces quenching of the fuel/air mixture.

Another object of the present invention is to provide a new and improved cooling means for cooling a wall member.

Another object of the present invention is to provide a combustor having new and improved means for cooling a liner thereof to allow for an increase in temperature of combustion gases immediately adjacent a surface of the liner facing the combustion gases.

Another object of the present invention is to provide a combustor having new and improved means for cooling a liner portion thereof to allow for the elimination of film cooling of that liner portion to reduce quenching of the fuel/air mixture for reducing exhaust emissions.

SUMMARY OF THE INVENTION

The present invention comprises a method and apparatus for improving cooling of a wall in a gas turbine engine. The method and apparatus provide breach cooling of an imperforate wall, such as a combustor liner, for improving the cooling thereof. The breach cooling is effected by structure for channeling a cooling fluid as a jet toward an outer surface of the imperforate wall, with the jet having sufficient momentum to breach a boundary layer of the cooling fluid which forms over the wall outer surface to allow the jet to contact the wall outer surface for more effective cooling thereof.

In an exemplary embodiment of the invention, the breach-cooled wall is an upstream portion of the gas turbine engine combustor, and the inner surface of the combustor liner facing the combustion gases is characterized by not having a film-cooling boundary layer of air to reduce quenching of the combustion gases for reducing exhaust emissions.

BRIEF DESCRIPTION OF THE DRAWING

The novel features believed characteristic of the invention are set forth in the claims. The invention, in accordance with a preferred, exemplary embodiment, together with further objects and advantages thereof, is more particularly described in the following detail description taken in conjunction with the accompanying drawings in which:

FIG. 1 is a sectional view of a gas turbine engine combustor in accordance with one embodiment of the present invention.

FIG. 5 is a partly sectional schematic view of one of the inlets illustrated in FIG. 3 illustrating a flow-turning skirt in accordance with one embodiment of the present invention.

FIG. 6 is a partly sectional perspective view of a hollow gas turbine engine blade including a breach-cooled concave wall in accordance with another embodiment of the present invention.

DETAIL DESCRIPTION

Figure 3:
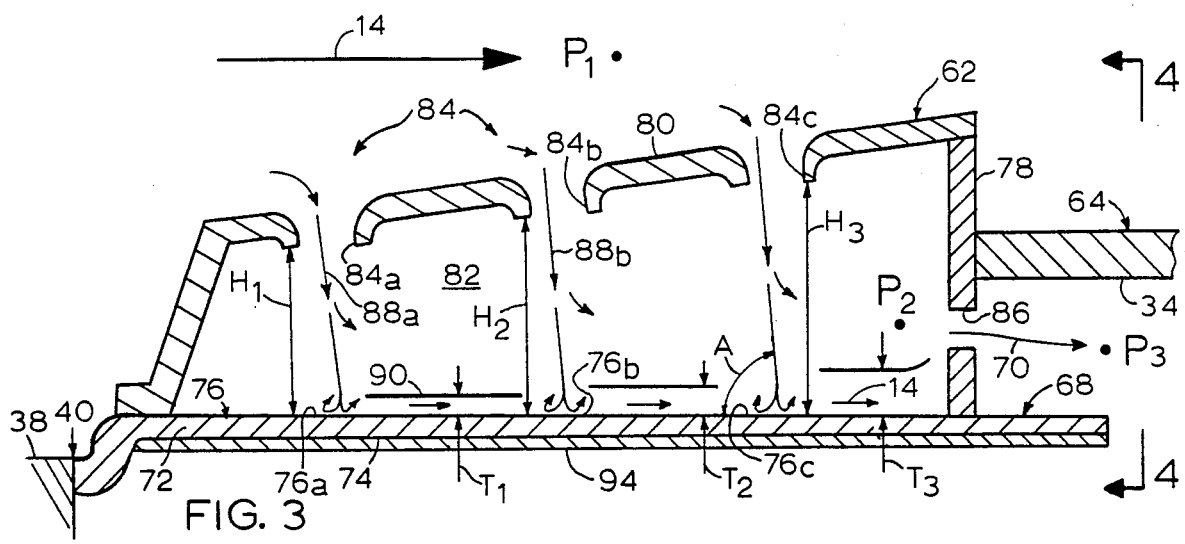
FIG. 3 is a sectional view of an enlarged portion of a first liner panel of the combustor illustrated in FIG. 1 in accordance with one embodiment of the present invention taken along line 3—3 of FIG. 2.

Illustrated in FIG. 1 is a sectional view of an annular gas turbine engine combustor 10 disposed concentrically about an engine centerline or axial axis 12. Disposed upstream of the combustor 10 is a conventional compressor (not shown) which provides compressed air, or cooling fluid, 14 to the combustor 10.

The combustor 10 includes an annular outer liner 16 having an outer surface 18 facing and spaced from an annular casing 20 to define an annular first passage 22 therebetween for receiving a portion of the cooling fluid 14. The combustor 10 also includes an annular inner liner 24 having an outer surface 26 spaced from and facing an inner casing 28 to define an annular second passage 30 therebetween for receiving a portion of the cooling fluid 14. The inner liner 24 is spaced from the outer liner 16 to define a combustion zone 32 therebetween. The outer liner 16 and the inner liner 24 include oppositely facing inner surfaces 34 and 36, respectively, which bound the combustion zone 32. The inner and outer liners 24, 16 are formed of a conventional metallic material such as commercially available Hastelloy X.

The combustor 10 also includes an annular dome 38 fixedly joined to upstream ends 40 and 42 of the outer liner 16 and inner liner 24, respectively. The combustor 10 also includes a plurality of circumferentially-spaced carburetors 44 disposed in the dome 38, with each including a conventional low pressure, airblast fuel injector 46 and a conventional counterrotating swirler assembly 48. Fuel 50 is discharged from the injector 46 into the swirler 48 and mixed with the air 14 to create a fuel/air mixture 52, which is discharged from an outlet 54 of each carburetor 44 into the combustion zone 32 for burning, or reacting, therein and generating combustion, or exhaust, gases 56. The exhaust gases 56 flow through the combustor 10 generally along a longitudinal axis 58 thereof and are discharged from a combustor outlet 60, from which they are then channeled to a turbine (not shown).

Each of the outer and inner liners 16 and 24 includes a plurality of serially-joined liner panels including a first liner panel 62 extending downstream from the dome 38 and followed, in turn, by a second liner panel 64 and a third liner panel 66. Disposed at the intersections of the first, second and third liner panels 62, 64 and 66 and at the downstream end of the third liner panel 66 are conventional film-cooling nuggets 68, each of which generally includes an aft-facing U-shaped pocket having an aperture in the base thereof for discharging the air 14. The cooling nuggets 68 are effective for channeling the cooling air 14 from the apertures as a boundary layer film 70 downstream along the inner surfaces 34 and 36 of the liners for providing film cooling thereof.

Inasmuch as the film cooling air 70 is substantially cooler than the combustion gases 56, quenching of the fuel/air mixture 52 by the film 70 results in unburned hydrocarbons and the formation of carbon monoxide. In order to reduce these exhaust emissions, modifications to a conventional film-cooled combustor were made for increasing the temperature of the boundary layer along the inner surfaces 34 and 36 of the first liner panel 62 to reduce the amount of quenching of the fuel/air mixture 52 for reducing exhaust emissions.

One modification was designed and built to have a reduced, minimum amount of film cooling along the first liner panel 62. However, test results showed that the cooling film was too thin and unstable and liner temperatures increased to unacceptably high levels. Another modification built and tested eliminated film cooling along the first liner panel 62 and relied for cooling, instead, by using conventional impingement cooling techniques. Impingement cooling was obtained by spacing an outer wall over the first liner panel 62, which wall included a relatively large number of small conventional impingement cooling holes. However, test results of two impingement-cooling design modifications showed that neither was successful in adequately cooling the first liner panel 62 without the use of film cooling.

The prior art recognizes that cross-flow in a conventional impingement-cooled structure reduces the effectiveness of impingement cooling severely. In conventional impingement cooling which utilizes rows of axially-spaced impingement holes, cooling air flowing from the upstream impingement cooling holes forms a boundary layer of cooling air along the outer surface of the liner, and it is believed that the boundary layer is reenergized and/or increased in thickness with the cooling fluid discharged through adjacent impingement holes and each succeeding row of impingement cooling holes. As a result, the effective heat transfer capability of impingement cooling is limited by the heat transfer capability of the boundary layer of air so formed.

The inventor has discovered that instead of using a relatively large number of relatively small conventional impingement cooling apertures, i.e. increasing the density of such apertures, for increasing the heat transfer coefficient of the cooling fluid, the use of a reduced number of relatively large cooling apertures can result in a substantial increase in heat transfer coefficient for cooling the liner.

The inventor has discovered a new method of and structure for cooling a wall for obtaining an increase in heat transfer therefrom. This is accomplished by a method of "breach" cooling an imperforate wall wherein a cooling fluid is channeled as a jet toward the outer surface of the wall with the jet having sufficient momentum to breach, i.e. penetrate, the boundary layer of cooling fluid which is formed over the wall outer surface, with the jet contacting the wall outer surface. In this method, the cooling air jet does not simply contact and merge with the boundary layer itself, but breaches that boundary layer to directly contact the wall outer surface.

Illustrated in more particularly in FIG. 3 is the first liner panel 62 of the outer liner 16, it being understood that a substantially identical, but inverted, panel 62 is also found in the inner liner 24. The first liner panel 62 is a breach-cooled structure including an imperforate inner, or first, wall 72 extending from the dome 38, at the upstream liner end 40, to the second liner panel 64. The inner wall 72 includes an inner surface 74 which faces the combustion zone 32, and an opposing outer, or first, surface 76. The first liner panel 62 further includes an aft wall 78 extending outwardly from the inner wall 72 at an aft end thereof. An outer, or second, wall 80 is spaced from the inner wall 72 and is suitably fixedly joined at an aft end thereof to the aft wall 78 and at an upstream end to the inner wall 72 itself to define an enclosed plenum 82 therebetween. The outer wall 80 includes a plurality of inlet apertures, or simply inlets, 84 which face the outer surface 76. The aft wall 78 includes a plurality of circumferentially-spaced outlet apertures, or simply outlets, 86 for discharging the cooling fluid 14 from the plenum 82.

The first liner panel 62 further includes means for channeling the cooling fluid 14 from each of the inlets 84 as a jet 88 (i.e. jets 88a, 88b, 88c) across the plenum 82 to breach a boundary layer of air 90 which forms along the outer surface 76 to make direct contact with the outer surface 76. The channeling means includes, inter alia, the inlets and outlets 84 and 86 being sized and positioned so that the momentum (mass times velocity) of the cooling fluid jet 88 flowable through the inlets 84 is sufficient to breach the boundary layer 90 to contact the outer surface 76.

To assist in turning the cooling fluid 14 from a generally longitudinal direction over the outer wall 80 to an inward direction oblique to the outer wall, an annular flow-turning skirt 92, as illustrated in FIGS. 3 and 5, is preferably attached to or formed integral with each inlet 84. The skirt 92 preferably extends below the outer wall 80 a minimum of about two wall thicknesses thereof for effectively turning the cooling air 14 and directing the jets 88. In one embodiment of the invention built and tested, the skirts 92 were effective for directing the jets 88 toward the inner wall 72 at an angle A measured therebetween of about 75°.

FIG. 3 illustrates that during operation of the combustor 10, the cooling fluid 14 at the inlets 84 is at a static pressure $P_1$, which represents compressor discharge pressure. The static pressure of the cooling fluid 14 in the plenum 82 at the outlet 86 has a value $P_2$. And the static pressure of the cooling fluid 14 in the cooling nuggets 68 downstream of the outlet 86 has a value $P_3$, which represents turbine inlet static pressure. The total pressure drop, $P_1$ minus $P_3$, designated $P_{13}$, is a given value and is controlled by the engine cycle.

In accordance with another feature of the present invention, a first pressure drop $P_1$ minus $P_2$, designated $P_{12}$, is made predeterminedly larger than a second pressure drop $P_2$ minus $P_3$, designated $P_{23}$, to assist in ensuring breach cooling of the inner wall 72. Since the total static pressure drop $P_{13}$ is a given, the inlets 84 and the outlets 86 may be sized so that the first pressure drop $P_{12}$ has a maximum value and the second pressure drop $P_{23}$ has a minimum value to ensure that all of the jets 88 breach the boundary layer 90. This may be accomplished by simply increasing the flow area of the outlets 86 to as large as possible within the physical bounds imposed by the cooling nuggets 68 while still providing an effective amount of film cooling from the outlets 86 along the inner surface 34 of the second liner panel 64 disposed downstream from the first liner panel 62. For comparison purposes, in a conventional impingement-cooled structure the static pressure drop across impingement holes is typically about equal to the static pressure drop across outlet holes which feed conventional film-cooling nuggets.

Figure 2:
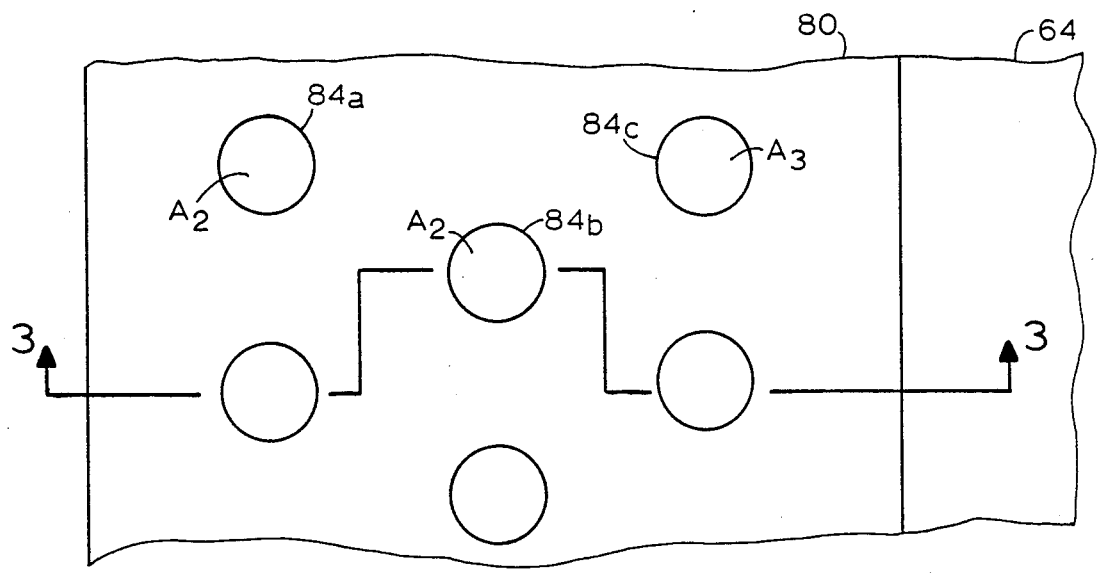
FIG. 2 is a plan view of a portion of the first panel illustrated in FIG. 1 taken along line 2—2.

In a preferred embodiment of the invention as illustrated in FIGS. 2 and 3, the inlets 84 include a first, upstream row of circumferentially-spaced first inlet apertures 84a, a second row of circumferentially-spaced second inlet apertures 84b spaced longitudinally downstream of the first inlets 84a and followed, in turn, by a third row of circumferentially-spaced third, aft inlet apertures 84c. Each of the inlets 84a, 84b and 84c has a flow area $A_1$, $A_2$, $A_3$, respectively, and is spaced perpendicularly from the outer surface 76 a distance $H_1$, $H_2$, and $H_3$, respectively.

A first jet 88a of cooling fluid 14 is generated by the first inlet 84a to contact a first, upstream portion 76a of the outer surface 76 and forms the boundary layer 90, which has a momentum and a thickness $T_1$, and is flowable downstream over a second portion 76b of the outer surface 76, which faces the second inlet 84b. The flow area $A_2$ of the second inlet 84b along with the momentum of a second jet 88b generated by the second inlet 84b are predeterminedly selected relative to the thickness $T_1$ and momentum of the boundary layer 90 to ensure that the second jet 88b breaches the boundary layer 90 to contact the outer surface second portion 76b.

Similarly, the flow area $A_3$ of the third inlet 84c and the momentum of a third jet 88c generated by the third inlet 84c are predeterminedly selected relative to the momentum and thickness $T_2$ of the boundary layer 90, which flows over the outer surface third portion 76c to ensure that the third jet 88c breaches the boundary layer 90 to contact the outer surface 76.

The boundary layer 90 increases in thickness in the downstream direction, since the amount of cooling fluid 14 is cumulative from the inlets 84. Therefore, the thickness $T_3$ is greater than $T_2$ and, in turn, is greater than $T_1$. Although each of the inlets 84a, 84b, and 84c could be tailored to obtain maximum breach cooling with minimum cooling fluid 14 to breach the respective thicknesses of the boundary layer 90, for ease of manufacture, uniform inlets 84a, 84b, and 84c may be selected to obtain an effective amount of breach cooling.

The number of rows of the inlets 84 is limited by the ability of the jets 88 to penetrate the boundary layer 90. Too many rows of inlets 84 will result in a boundary layer 90 which cannot be penetrated by the jets 88, which will substantially reduce the cooling ability and heat transfer coefficient of the structure. For the exemplary gas turbine engine combustor actually constructed and tested, it appears that an optimum number of rows of inlets 84 is limited to no more than three rows.

In order to minimize the strength and thickness of the boundary layer 90 and to more uniformly cool the inner wall 72, it is preferred that the second inlets 84b are circumferentially spaced between the first inlets 84a and the third inlets 84c as illustrated in FIG. 3.

Inasmuch as each jet 88 effects a cooling area in the inner wall outer surface 76, the inlets 84 are predeterminedly spaced from each other so that the cooling areas of the jets 88 overlap each other for obtaining a generally uniform temperature of the inner wall outer surface 76.

In a preferred embodiment actually built and tested, the inlets 84 had a uniform 0.115 inch diameter and were spaced from each other 0.28 inch in the longitudinal direction between rows and 0.77 inch in the circumferential direction. The heights $H_1$, $H_2$ and $H_3$ were 0.25 inch, 0.30 inch, and 0.35 inch, respectively. The total static pressure $P_{13}$ was about 14 psi, and the first pressure drop $P_{12}$ was about 11 psi and the second pressure drop $P_{23}$ was about 3 psi.

From the above teachings, the particular design parameters for obtaining breach cooling may be conventionally determined. For example, the following equations may be used:

$$h = Nu k / D \qquad (1)$$

where h is the heat transfer coefficient of the outer surface 76 at each row of inlets 84, Nu is the conventionally known Nusselt number which is a function of the size, spacing and pitch of the inlets 84 and the angle A of the jets 88, k is the thermal conductivity of the cooling fluid 14 and D is the diameter of the inlets 84.

$$Nu = CRe^m Pr^{\frac{1}{3}} (H/D)^{.091} \qquad (2)$$

wherein the additional parameter C is a constant, m is a variable, Re is the conventionally known Reynolds number, Pr is the conventionally known Prandtl number which is substantially constant for the cooling fluid 14 at a given temperature, and H is the height $H_1$, $H_2$, or $H_3$ of the inlets 84. The parameters C and m are conventionally determined from empirical data generated for particular applications and are a function of the thickness and momentum of the boundary layer 90.

$$Re = \phi V D / \mu \qquad (3)$$

wherein the additional parameter $\phi$ is the density of the cooling fluid 14, V is the velocity of the jet 88 and $\mu$ is the absolute coefficient of viscosity of the cooling fluid 14.

$$V = W / \phi A_e \qquad (4)$$

wherein the additional parameter W is the mass flow rate of the cooling fluid 14 through each row of the inlets 84, and $A_e$ is the conventionally known effective area of each row of the inlets 84 (e.g. $A_1$, $A_2$, $A_3$).

$$W = (A_e / A_{et}) W_t \qquad (5)$$

wherein the additional parameter $A_{et}$ is the sum of the effective area of all the inlet rows and $W_t$ is the total mass flow rate.

$$W_t = \sqrt{(P_1 - P_3) 2\phi} \; A_{eo} \qquad (6)$$

wherein the additional parameter $A_{eo}$ is the overall effective flow area of the inlets 84 and outlets 86.

$$\frac{1}{A_{eo}^2} = \frac{1}{A_{et}^2} + \frac{1}{A_{ed}^2} \qquad (7)$$

wherein the additional parameter $A_{ed}$ is the sum of the effective areas of the outlets 86. These equations can be used to determine the heat transfer coefficient h due to each row of the jets 88 based on the above parameters. An iterative technique is used to vary the design parameters for obtaining a heat transfer coefficient h which is larger than that which would be obtained for conventional impingement cooling.

For example, a heat transfer coefficient h of about 600 btu/hr-ft²-°F. is typical of conventional impingement cooling. In contrast, a heat transfer coefficient h of about 900 btu/hr-ft²-°F. was obtained for the preferred embodiment of breach cooling illustrated in FIG. 3. This represents a substantial 50% improvement. The substantial benefit of breach cooling is further emphasized in comparison to conventional film cooling of a back surface of an imperforate liner resulting in a typical heat transfer coefficient of about only 300 btu/hr-ft²-°F.

The limit of the number of rows of the inlets 84 can be appreciated from the following equations:

$$h_{avg} = Ke^{-c(N-1)} \qquad (8)$$

where $h_{avg}$ is the average heat transfer coefficient due to a particular row, K and c are constants, and N is the total number of rows of the inlets 84. For one row of inlets, K would be equal to the average heat transfer coefficient for that row.

$$h_t = h_{avg}(1 - c(N-1)) \qquad (9)$$

wherein the additional parameter $h_t$ is the average heat transfer coefficient due to all the inlets 84.

Accordingly, as the number of rows N of the inlets 84 increases the average heat transfer coefficient $h_t$ due to all the inlets decreases. Equations 8 and 9 represent the effect of the increasing thickness of the boundary layer 90. When a relatively large number of rows N is used, the breach cooling effect will be lost, resulting more closely in a conventional impingement-cooled structure. As indicated above, in one embodiment of the invention three rows of the inlets 84 were found to be effective for obtaining breach cooling.

Figure 4:
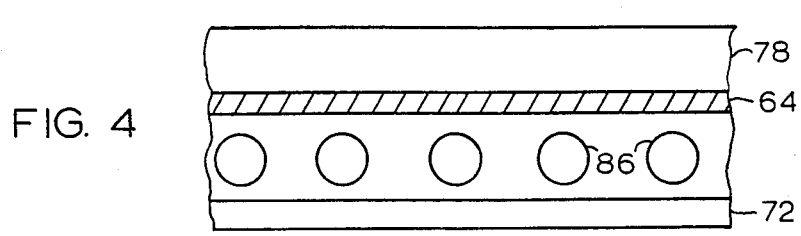
FIG. 4 is an end, partly sectional, view of the first panel illustrated in FIG. 3 taken along line 4—4.

As illustrated in FIGS. 3 and 4, the inner wall 72 is spaced from and overlaps the second liner panel 64 to define the cooling nugget 68, which includes a downstream end of the inner wall 72, a portion of the aft wall 78 including the outlets 86, and an upstream portion of the second liner panel 64. The cooling fluid 14 is discharged from the plenum 82 through the outlets 86 and is caused by the cooling nuggets 68 to flow as the boundary layer film 70 of cooling air along the inner surface 34 of the outer liner 16 in a conventionally known manner.

The breach-cooled structure, i.e. first liner panel 62 as substantially illustrated in FIG. 3, was tested and was found to be effective for obtaining acceptably low temperatures of inner wall 72 by dissipating heat from the inner wall 72, which had a heat flux rate of about 450,000 btu/hr-ft², since no film cooling on the combustion side of the wall was utilized. This is a substantial increase in heat flux when compared to the heat flux of about 150,000 btu/hr-ft², which is typically found in a conventional liner provided with primarily film cooling of the surface of the liner facing the combustion zone.

Inasmuch as the high heat flux through the first liner panel 62 is effectively dissipated by the breach cooling, the combustor 10 can be operated without film cooling of the inner surface of the first panel 62, thus increasing the temperature which the fuel/air mixture 52 experiences along the inner wall 72 and resulting in reduced exhaust emissions. In one embodiment tested, the inner surface was effectively operated at about 1500° F. without the need for film cooling thereof.

To further reduce the unburned hydrocarbon and carbon monoxide exhaust emissions, a preferred embodiment of the invention further includes a thermal barrier coating 94 over the entire inner surface 74 of the inner wall 72. The coating 94 is conventional, and 8% yittrium-zirconia was used in the preferred embodiment with a thickness of about 10 mils. With the coating 94, the heat flux through the inner wall 72 was reduced to about 300,000 btu/hr-ft². By utilizing the coating 94, the surface of the coating 94 facing the combustion zone 32 experienced a temperature of about 1900° F. in the preferred embodiment tested, and, at this temperature, the unburned hydrocarbons and carbon monoxide were substantially reduced so that the combustor 10 was able to meet the more stringent recently issued FAA and ICAO emissions requirements.

The breach-cooled first liner panel 62 is utilized solely as the liner immediately downstream from the dome 38 for several reasons. Although the breach-cooled liner panel 62 has a high heat transfer coefficient, a relatively large differential in temperature exists from the inner surface 74 to the outer surface 76. Large temperature gradients are generally undesirable because they may shorten the useful life of a structure. Furthermore, inasmuch as combustion occurs primarily in the combustion zone 32 in the vicinity immediately downstream of the dome 38 and generally within the first liner panel 62, breach cooling of the first liner panel 62 only was found effective for adequately reducing the exhaust emissions to meet the FAA and ICAO requirements. Accordingly, the second and third liner panels 64 and 66 remain basically unchanged from the original and conventional film-cooling design.

Since the first liner panel 62 is operated without film cooling of the inner surface for reducing exhaust emissions, it was found that conventional cooling, including impingement cooling, was not adequate to effectively cool an imperforate liner wall. It was also found that only breach cooling in accordance with the invention was effective for adequately cooling the imperforate inner wall 72.

Although the invention was conceived for reducing exhaust emissions from a combustor, it is clear that the improved cooling realizable from the disclosed breach-cooling structure may also be utilized in other structures requiring cooling. For example, illustrated in FIG. 6 is a hollow gas turbine engine rotor blade 96 through which the cooling fluid 14 flows. The blade 96 includes an imperforate concave outer, or first, wall 98 having an inner, first surface 100, and an outer, second surface 102 over which the combustion gases flow. An insert, or second wall, 104 is disposed in the blade 96 and is spaced from the inner surface 100 to define a plenum 106. The insert 104 includes three axially-spaced rows, each including a plurality of radially-spaced inlets 108. The blade 96 includes a plurality of radially-spaced trailing edge outlets 110 which discharge cooling fluid from the plenum 106. The insert 104, concave wall 98, inlets 108 and outlets 110 are generally similar to the breach-cooling structure illustrated in FIG. 2. The inlets 108 and the outlets 110 are predeterminedly sized and configured to provide breach cooling of the concave side 98 of the blade 96.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

For example, although only the first liner 62 is shown as being breach-cooled, any liner portion or an entire combustor liner may be breach-cooled, depending on particular design requirements. Although one embodiment tested suggests that three rows of inlets 84 provide optimum cooling, the actual limit on the number of rows is limited only by the ability to achieve the improved heat transfer coefficient from the breach cooling disclosed herein.

Accordingly, what is desired to be secured by Letters Patent of the United States is the invention as recited in the following claims:

1. A breach-cooled structure comprising:
   an imperforate first wall having a first surface;
   a second wall spaced from said first wall and joined thereto to define an enclosed plenum;
   channeling means including said second wall having a plurality of longitudinally spaced rows of inlets facing said first wall first surface for channeling a cooling fluid through said inlets into said plenum to form a boundary layer of said cooling fluid along said first wall first surface;
   said plenum including a plurality of outlets for discharging said cooling fluid therefrom; and
   said channeling means further being effective for channeling said cooling fluid as jets from said inlets of a downstream one of said inlet rows across said plenum to breach said boundary layer of said cooling fluid to contact said first wall first surface for the breach cooling thereof.

2. A breach-cooled structure according to claim 1 wherein said channeling means further comprises said inlets and outlets being sized and positioned to generate said jets of said cooling fluid from said inlets into said plenum having momentum sufficient to breach said cooling fluid boundary layer on said first wall surface.

3. A breach-cooled structure according to claim 2 wherein said inlets and outlets are sized to generate a first pressure drop across said inlets and a second pressure drop across said outlets, and said first pressure drop is larger than said second pressure drop.

4. A breach-cooled structure according to claim 3 wherein said first and second pressure drops are equal to a predetermined total static pressure drop across said inlets and outlets, and said inlets and outlets are sized so that said first pressure drop represents a maximum value and said second pressure drop represents a minimum value for enhancing said breach cooling of said first wall.

5. A breach-cooled structure according to claim 4 wherein said inlets and outlets are sized for obtaining enhanced breached cooling of said first wall while providing an effective amount of film cooling from said outlets along an inner surface of a second wall disposed downstream of said breach-cooled inner wall.

6. A breach-cooled structure according to claim 2 wherein said inlets include a first row of circumferentially-spaced first inlets and a second row of circumferentially-spaced second inlets spaced longitudinally downstream from said first inlets and wherein said first and second inlets and said outlets are sized and positioned to generate a first jet of cooling fluid from each of said first inlets to contact a first portion of said first wall first surface and form a boundary layer of cooling fluid, having momentum and a thickness, to flow downstream over a second portion of said first wall first surface facing said second inlets, and wherein each of said second inlets is sized to have a flow area and to generate a second jet of said cooling fluid having momentum, said second inlet flow area and jet momentum being predeterminedly selected relative to said thickness and momentum of said boundary layer to ensure that said second jet breaches said boundary layer to contact said first wall first surface.

7. A breach-cooled structure according to claim 6 further including a third row of a plurality of circumferentially-spaced third inlets disposed downstream from said second row and facing toward a third portion of said first wall first surface, each of said third inlets is sized to have a flow area and to generate a third jet of said cooling fluid having momentum;

said second inlet flow area and jet momentum being predeterminedly selected relative to said thickness and momentum of said boundary layer flowable over said second portion first wall first surface to ensure that said second jet breaches said boundary layer to contact said first wall first surface; and said third inlet flow area and jet momentum being predeterminedly selected relative to said thickness and momentum of said boundary layer flowable over said third portion first wall first surface to ensure that said third jet breaches said boundary layer to contact said first wall first surface.

8. A breach-cooled structure according to claim 7 wherein said second wall includes no more than said three rows of inlets.

9. A breach-cooled structure according to claim 7 wherein said second inlets are spaced circumferentially from both said first and third inlets.

10. A breach-cooled structure according to claim 7 wherein each of said inlets includes a skirt for improving turning of cooling fluid from a generally longitudinal downstream direction along an outer surface of said second wall to an inward direction oblique to said second wall for breaching against said first wall.

11. A breach-cooled structure according to claim 7 wherein each of said jets effects a cooling area in said first surface of said first wall and wherein said inlets are predeterminedly spaced from each other so that the cooling areas of said jets overlap each other for obtaining a generally uniform temperature of said first wall first surface.

12. A breach-cooled structure according to claim 11 wherein said breach-cooled structure comprises a portion of a gas turbine engine combustor, said combustor including an inner liner spaced from an outer liner to define a combustion zone therebetween, said inner and outer liners having first liner panels joined to an annular dome, said dome including a plurality of circumferentially-spaced carburetors for providing a fuel/air mixture which is burnable in said combustion zone, said inner and outer liners further including second liner panels extending downstream from said first liner panels, said first liner panels each comprising said breach-cooled structure wherein said first wall is an inner wall and said second wall is an outer wall and said inner walls define a portion of said combustion zone and said outlets discharge cooling fluid as a film along inner surfaces of said second liner panels for film cooling thereof.

13. A gas turbine engine combustor according to claim 12 wherein said inner walls include inner surfaces facing said combustion zone which are subject to radiation and convective heating from said combustion zone, and said combustor is characterized by having no film cooling of said inner wall inner surfaces for reducing unburned hydrocarbon and carbon monoxide emissions.

14. A gas turbine engine combustor according to claim 13 wherein said inner wall inner surfaces include a thermal barrier coating for further reducing unburned hydrocarbon and carbon monoxide emissions.

15. A breach-cooled structure according to claim 2 wherein said breach-cooled structure comprises a portion of a gas turbine engine blade wherein said imperforate first wall is a portion of an outer wall of said blade and said second wall is an insert disposed inside said blade.

16. A gas turbine blade according to claim 15 wherein said plenum outlets comprise a plurality of outlets disposed in a trailing edge of said blade.

17. A gas turbine blade according to claim 16 wherein said insert includes no more than three rows of said inlets.

18. A combustor for a gas turbine engine comprising:
an outer liner;
an inner liner spaced from said outer liner to define a combustion zone therebetween;
a dome joined to upstream ends of said inner and outer liners;
a carburetor disposed in said dome and including a fuel injector and a swirler assembly for providing a fuel/air mixture from an outlet of said carburetor into said combustion zone for burning therein;
each of said inner and outer liners comprising a plurality of serially-joined liner panels, including a first liner panel extending downstream from said dome, said first liner panel comprising:
an imperforate inner wall having an outer surface;
an aft wall extending outwardly from said inner wall;
an outer wall spaced from said inner wall and joined to said aft wall to define an enclosed plenum;
channeling means including said outer wall having a plurality of longitudinally spaced rows of inlets facing said inner wall outer surface for channeling a cooling fluid through said inlets into said plenum to form a boundary layer of said cooling fluid along said inner wall outer surface;
said aft wall including a plurality of outlets for discharging said cooling fluid from said plenum; and
said channeling means further being effective for channeling said cooling fluid as jets from said inlets across said plenum to breach said boundary layer of said cooling fluid to contact said inner wall outer surface for the cooling thereof.

19. A gas turbine engine combustor according to claim 18 wherein said inner walls include inner surfaces facing said combustion zone which are subject to radiation and convective heating from said combustion zone, and said combustor is characterized by having no film cooling of said inner wall inner surfaces for reducing unburned hydrocarbon and carbon monoxide emissions.

20. A gas turbine engine combustor according to claim 19 wherein said inlets include a first row of circumferentially-spaced first inlets and a second row of circumferentially-spaced second inlets spaced longitudinally downstream from said first inlets and wherein said first and second inlets and said outlets are sized and positioned to generate a first jet of cooling fluid from each of said first inlets to contact a first portion of said inner wall outer surface and form said boundary layer of cooling fluid, having momentum and a thickness, to flow downstream over a second portion of said inner wall outer surface facing said second inlets, and wherein each of said second inlets is sized to have a flow area and to generate a second jet of said cooling fluid having momentum, said second inlet flow area and jet momentum being predeterminedly selected relative to said thickness and momentum of said boundary layer to ensure that said second jet breaches said boundary layer to contact said inner wall outer surface.

21. A gas turbine engine combustor according to claim 20 further including a third row of a plurality of circumferentially-spaced third inlets disposed downstream from said second row and facing toward a third portion of said inner wall outer surface, and wherein said second inlets channel said second jets to join said boundary layer of cooling fluid having momentum and a thickness to flow downstream over said third portion of said inner wall outer surface, each of said third inlets being sized to have a flow area and to generate a third jet of said cooling fluid having momentum;

said second inlet flow area and jet momentum being predeterminedly selected relative to said thickness and momentum of said boundary layer flowable over said second portion inner wall outer surface to ensure that said second jet breaches said boundary layer to contact said inner wall outer surface; and said third inlet flow area and jet momentum being predeterminedly selected relative to said thickness and momentum of said boundary layer flowable over said third portion inner wall outer surface to ensure that said third jet breaches said boundary layer to contact said inner wall outer surface.

22. A gas turbine engine combustor according to claim 21 wherein said outer wall includes no more than said three rows of inlets.

23. A gas turbine engine combustor according to claim 21 wherein said second inlets are spaced circumferentially from both said first and third inlets.

24. A gas turbine engine combustor according to claim 21 wherein each of said inlets includes a skirt for improving turning of cooling fluid from a generally longitudinal downstream direction along an outer surface of said outer wall to an inward direction oblique to said outer wall for breaching against said inner wall.

25. A gas turbine engine combustor according to claim 21 wherein each of said jets effects a cooling area in an outer surface of said inner wall and wherein said inlets are predeterminedly spaced from each other so that the cooling areas of said jets overlap each other for obtaining a generally uniform temperature of said inner wall outer surface.

26. A gas turbine engine combustor according to claim 21 wherein said first and second inlets and said outlets are sized to generate a first pressure drop across said inlets and a second pressure drop across said outlets, and said first pressure drop is larger than said second pressure drop.

27. A gas turbine engine combustor according to claim 21 wherein said first and second pressure drops are equal to a predetermined total static pressure drop across said inlets and outlets, and said inlets and outlets are sized so that said first pressure drop represents a maximum value and said second pressure drop represents a minimum value for enhancing said breach cooling of said inner wall while providing an effective amount of film cooling from said outlets along an inner surface of a second liner panel extending downstream from said first liner panel.

* * * * *